(12) United States Patent
Chen et al.

(10) Patent No.: US 10,998,589 B2
(45) Date of Patent: May 4, 2021

(54) BATTERY PACK AND ELECTRIC VEHICLE (71) Applicant: Contemporary Amperex Technology Co., Limited, Fujian (CN)

(72) Inventors: Xingdi Chen, Nindge (CN); Peng Wang, Ningde (CN); Linggang Zhou, Ningde (CN)

(73) Assignee: Contemporary Amperex Technology Co., Limited, Ningde (CN)

(*) Notice: Subject to any disclaimer, the term of this patent is extended or adjusted under 35 U.S.C. 154(b) by 109 days.

(21) Appl. No.: 16/428,357

(22) Filed: May 31, 2019

(65) Prior Publication Data
US 2019/0386358 A1 Dec. 19, 2019

(30) Foreign Application Priority Data
Jun. 14, 2018 (CN) .......................... 201810614053.0

(51) Int. Cl.
*H01M 10/625* (2014.01)
*H01M 10/613* (2014.01)
(Continued)

(52) U.S. Cl.
CPC ............ *H01M 10/625* (2015.04); *B60K 1/04* (2013.01); *B60L 50/64* (2019.02); *B60L 50/66* (2019.02);
(Continued)

(58) Field of Classification Search
CPC ............ H01M 2/1077; H01M 2/1083; H01M 10/625; H01M 2220/20; H01M 10/0525;
(Continued)

(56) References Cited

U.S. PATENT DOCUMENTS 9,533,600 B1    1/2017 Schwab et al.
2008/0318119 A1* 12/2008 Watanabe .............. B60L 50/64
                                                            429/99
(Continued)

FOREIGN PATENT DOCUMENTS

CN      106025132 A    10/2016
CN      206878068 U     1/2018
WO      2018112619 A1   6/2018

OTHER PUBLICATIONS

European Search Report in Application No. 19176979.3 dated Jul. 1, 2019, 6 pages.

*Primary Examiner* — Gregg Cantelmo
(74) *Attorney, Agent, or Firm* — DLA Piper LLP US (57) ABSTRACT

The present disclosure provides a battery pack and an electric vehicle. The battery pack includes a casing wherein the battery is placed, a cooling plate located below the casing in a height direction, and a bracket assembly located below the cooling plate in a height direction and fixedly connected to the casing, the bracket assembly is used for direct contact with a mounting plate of the electric vehicle. When the battery pack of the present disclosure is used in an electric vehicle, since the bracket assembly separates the cooling plate from the mounting plate of the electric vehicle, the cooling plate does not need to directly exchange heat with the mounting plate, thereby reducing the influence of the temperature of the mounting plate on the cooling plate, and increasing the cooling or heating efficiency of the cooling plate to the battery inside the casing.

15 Claims, 10 Drawing Sheets (51) Int. Cl.
*H01M 10/6554* (2014.01)
*B60L 50/64* (2019.01)
*B60L 50/60* (2019.01)
*B60K 1/04* (2019.01)
*H01M 10/0525* (2010.01)
*H01M 50/20* (2021.01)
*H01M 50/249* (2021.01)
*H01M 50/244* (2021.01)
*H01M 10/615* (2014.01)

(52) U.S. Cl.
CPC ..... *H01M 10/0525* (2013.01); *H01M 10/613* (2015.04); *H01M 10/615* (2015.04); *H01M 10/6554* (2015.04); *H01M 50/20* (2021.01); *H01M 50/244* (2021.01); *H01M 50/249* (2021.01); *H01M 2220/20* (2013.01)

(58) Field of Classification Search
CPC ............ H01M 10/613; H01M 10/615; H01M 10/6554; H01M 50/20; H01M 50/244; H01M 50/249; B60K 1/04; B60L 50/64; B60L 50/66
See application file for complete search history.

(56) References Cited

U.S. PATENT DOCUMENTS

2009/0246606 A1\* 10/2009 Shimizu .............. H01M 10/625
429/62
2016/0141735 A1 5/2016 Motohashi et al.
2017/0047623 A1 2/2017 Kim et al.

\* cited by examiner

BATTERY PACK AND ELECTRIC VEHICLE

PRIORITY

The present application claims priority to C.N. Application No. CN201810614053.0 filed on Jun. 14, 2018, which is incorporated by reference herein.

FIELD

The present disclosure relates to the technical field of batteries and in particular, to a battery pack and an electric vehicle.

BACKGROUND

The desired normal operating temperature of a battery in a battery pack is from 20° C. to 35° C. In a cold or hot environment, in order to ensure the normal service life of the battery, the battery pack must be provided with a thermal management to adjust the working temperature of the battery by means of heating or cooling.

In order to adjust the working temperature of the battery while the battery pack is in operation, a conventional battery pack commonly uses the following solutions: (1) providing a cooling plate inside the battery case; and (2) providing a cooling plate outside the battery case.

For the first solution in which the cooling plate is placed inside the battery case, the existing structure of the battery pack needs to be redesigned, and since the space inside the battery case is relatively tight, this greatly limits the design. At the same time, in the case where coolant leaks from the cooling plate in the battery pack in a long-term use, on the one hand, the coolant may enable a conductivity connection between the outer part of the battery and the metal parts of the case, thereby reducing the overall insulation resistance of the case; on the other hand, the coolant may also accelerate the corrosion process of the metal parts of the case, which poses a safety hazard.

For the second solution in which the cooling plate is placed outside the battery case, although it solves the problem of space utilization inside the case and the impact of the coolant leakage on the interior of the battery case, in the case that the battery pack is used in an electric vehicle, the cooling plate of the battery pack may be in direct contact with a mounting plate of the electric vehicle, since the temperature of the mounting plate is close to the temperature of the external environment of the electric vehicle, when the electric vehicle is in an extremely cold or hot environment, the mounting plate may exchange heat with the cooling plate, thereby reducing the cooling or heating efficiency of the cooling plate with respect to the interior of the battery case.

SUMMARY

In view of the problems discussed in the previous section, an object of the present disclosure is to provide a battery pack and an electric vehicle, where a bracket assembly of the battery pack separates the cooling plate from the mounting plate of the electric vehicle, thereby reducing the impact of the temperature of the mounting plate on the cooling plate. In this way, the cooling or heating efficiency of the cooling plate is improved.

In order to achieve the above objective, the present disclosure provides a battery pack for an electric vehicle, which can include a casing, a cooling plate located below the casing in a height direction, and a bracket assembly located below the cooling plate in a height direction and fixedly coupled to the casing, and the bracket assembly is used for a direct contact with a mounting plate of the electric vehicle.

The bracket assembly can include at least two longitudinal beams, which are arranged apart along a width direction; and at least two transverse beams, which are arranged apart along a length direction, and two transverse beam ends in the width direction of each transverse beams are respectively fixedly connected to a corresponding longitudinal beam.

The cooling plate can include a main body portion and a plurality of first mounting portions, wherein each of the first mounting portions is protrudingly formed from the main body portion. In some embodiments, each of the longitudinal beams can include a plurality of second mounting portions formed on a side of the longitudinal beam facing the cooling plate, each of the second mounting portions engages a corresponding first mounting portion of the cooling plate and is fixedly connected to the corresponding first mounting portion.

The cooling plate can further include a plurality of first engaging portions formed on the side of the cooling plate facing the bracket assembly and arranged apart along the width direction; each of the transverse beams can further include a plurality of second engaging portions formed on the side of the transverse beams facing the cooling plate and arranged apart in the width direction, and each of the second engaging portions has a protrusion recess engagement with a corresponding one of the first engaging portions.

In some embodiments, each of the first engaging portions of the cooling plate can form a U-shaped structure. In some embodiments, the plurality of second engaging portions of the beams can form a serrated structure.

In some embodiments, each of the longitudinal beams can further include a plurality of third mounting portions formed on the side of the longitudinal beam facing the cooling plate and arranged apart in the length direction, and each of the third mounting portions is fixedly connected to a transverse beam end of a corresponding transverse beam.

In some embodiments, the bracket assembly can further include a protective beam fixedly connected to the longitudinal beam ends of each longitudinal beam in the length direction for protecting the cooling plate in the length direction.

In some embodiments, each of the longitudinal beams can further include a fourth mounting portion formed on the side of the longitudinal beam end facing the cooling plate and fixedly connected to the protective beam.

The protective beam can include a flat plate portion, which is arranged side by side with the at least two transverse beams; and a side plate portion, which protrudes from the flat plate portion in the height direction and is located on one side of the longitudinal direction of the cooling plate, and protects the cooling plate in the longitudinal direction.

In some embodiments, each of the longitudinal beams can further include a supporting member, which is formed on a side of the width direction of the longitudinal beam and extends in the width direction; and a mounting portion, which is formed on the other side in the width direction of a longitudinal beam and extends in the width direction.

The present disclosure also provides an electric vehicle including the battery pack, which includes a casing wherein a battery is placed, a cooling plate located below the casing in a height direction, and a bracket assembly located below the cooling plate in the height direction and fixedly connected to the casing, and the bracket assembly is used for a direct contact with a mounting plate of the electric vehicle.

Also disclosed is a method for regulating the temperature of a battery in a battery pack of an electric vehicle, the method includes providing a cooling plate in a direct contact with a battery casing in the battery pack and a bracket assembly providing separation between the cooling plate and a mounting plate of the electric vehicle, monitoring the working temperature of the battery in the battery casing, and adjusting the working temperature of the battery with the cooling plate, wherein the bracket assembly reduces thermal communication between the mounting plate and the cooling plate, thereby increasing the efficiency of the regulation of temperature of the battery.

In some embodiments, the beneficial effects of the present disclosure can include, but not limited to: the bracket assembly separates the cooling plate from the mounting plate of the electric vehicle, thereby reducing the impact of the temperature of the mounting plate on the cooling plate. In this way, the cooling or heating efficiency of the cooling plate is improved.

DESCRIPTION

The battery pack and electric vehicle according to the present disclosure will be further described in detail with reference to the accompanying drawings.

The elements in the figures are described in the following:
1: casing
11: the seventh mounting hole
2: cooling plate
21: main body portion
22: the first mounting portion
221: the first mounting hole
23: the first engaging portion
24: the extending portion
3: bracket assembly
31: longitudinal beam
311: longitudinal beam end
312: the second mounting portion
3121: the second mounting hole
313: the third mounting portion
3131: the third mounting hole
314: the fourth mounting portion
3141: the fourth mounting hole
315: supporting member
316: mounting member
3161: connecting hole
317: fixing hole
32: transverse beam
321: transverse beam end
3211: the fifth mounting hole
322: the second engaging portion
33: protective beam
331: the sixth mounting hole
332: flat plate portion
333: side plate portion
4: thermal pad
S: fastener
W: the width direction
L: the length direction
H: the height direction Disclosed herein is a battery pack design which utilizes a bracket assembly to separate a cooling plate for the battery casing from the mounting plate of an electric vehicle, the bracket assembly can also ensure the whole battery pack is fastened onto the mounting plate. As a result, the battery casing and the cooling plate are isolated from the rest of the electric vehicle specifically from the mounting plate, which prevents the influence of external temperature on the cooling plate and leads to a better temperature control over the battery casing.

Figure 1:
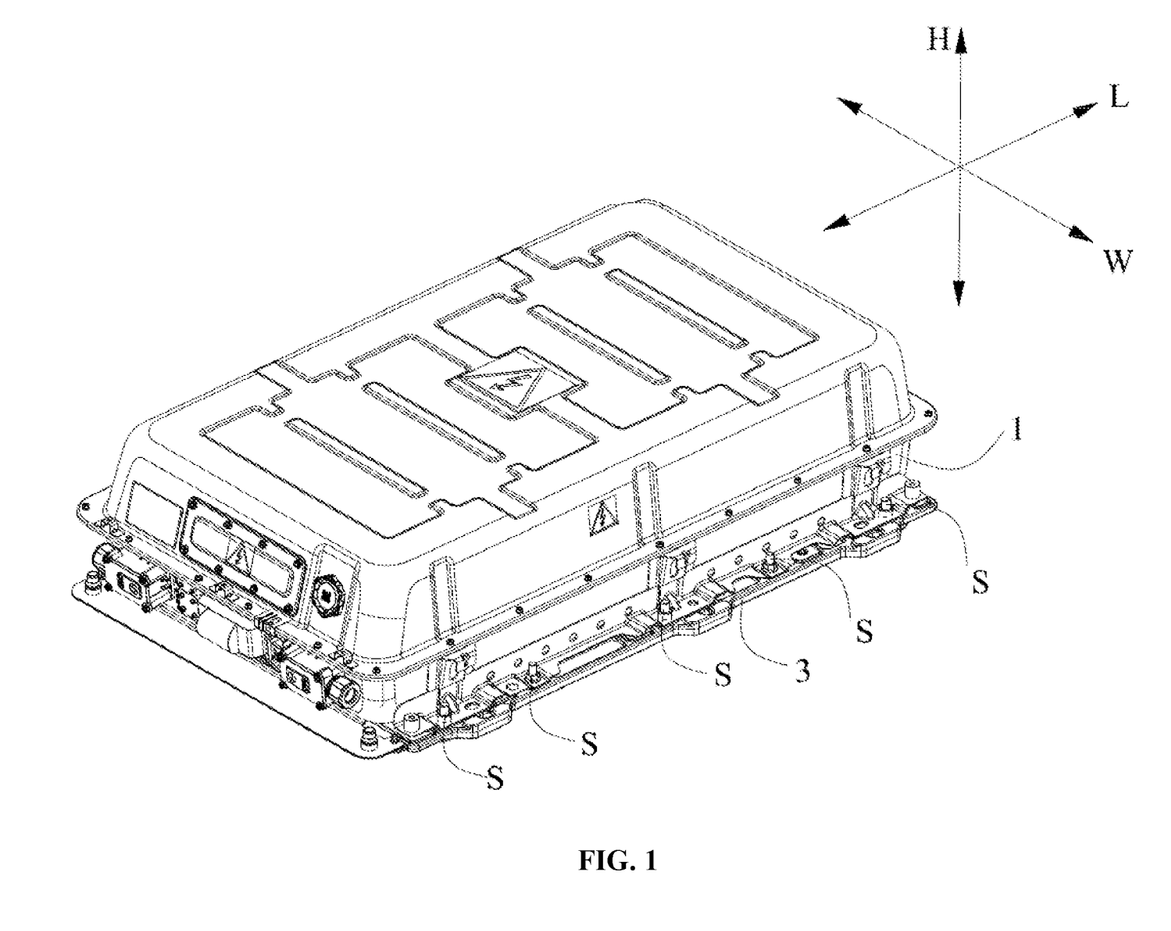
FIG. 1 is a perspective view of a battery pack, according to some embodiments of the present disclosure.
Figure 2:
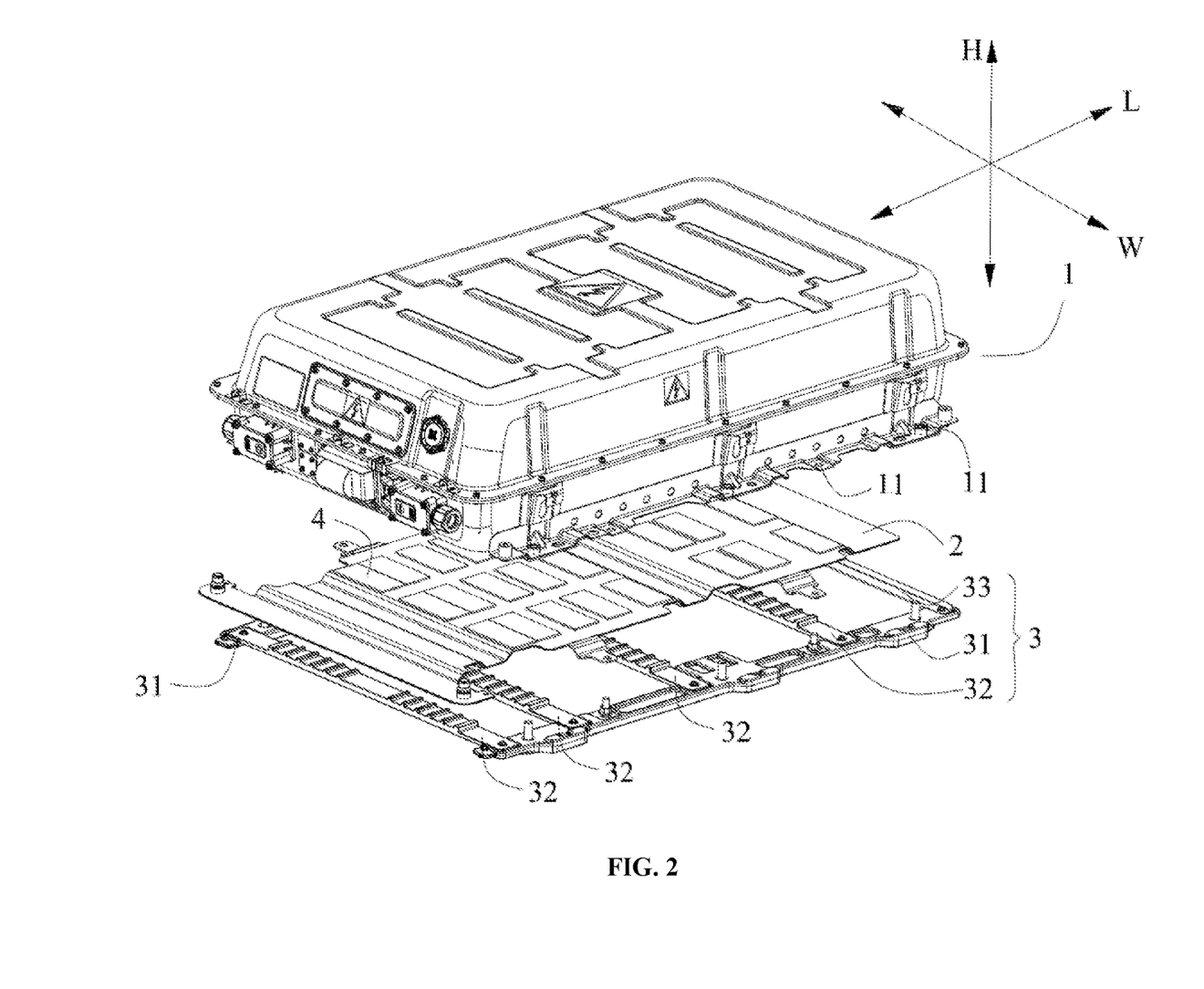
FIG. 2 is an close-up view of FIG. 1, according to some embodiments of the present disclosure.

In reference to FIGS. 1 and 2, an electric vehicle according to the present disclosure can include a mounting plate (not shown) and a battery pack. The mounting plate can be used to mount the battery pack and make direct contact with the battery pack.

In reference to FIGS. 1 and 2, the battery pack can include a casing 1 in which a battery (not shown) is placed, a cooling plate 2 located below the casing 1 in the height direction H, and a bracket assembly 3 located below the cooling plate 2 in the height direction H and fixedly connected to the casing 1. In addition, the bracket assembly 3 is in a direct contact with a mounting plate. Since the bracket assembly 3 of the battery pack separates the cooling plate 2 from the mounting plate, the cooling plate 2 does not directly exchange heat with the mounting plate, thereby reducing impact of the temperature of the mounting plate (especially when the electric vehicle is in an extremely cold or hot environment) on the cooling plate 2, and improving the cooling or heating efficiency of the cooling plate 2 with respect to the battery inside the casing 1.

The type of battery can include, but is not limited to, lithium ion battery, aluminum ion battery, carbon battery, flow battery, lead-acid battery, glass battery, magnesium ion battery, metal air battery, molten salt battery, nickel cadmium battery, nickel hydrogen battery, nickel iron battery, nickel metal hydride battery, nickel zinc battery, organic radical battery, polymer-based battery, fuel cell, lithium sulfur battery, sodium ion battery, sodium sulfur battery, and zinc ion battery. In some embodiments, the battery is a lithium ion battery.

In reference to FIG. 2, the casing 1, the cooling plate 2, and the bracket assembly 3 are each a separate component. Accordingly, in the case where the cooling plate 2 fails, the cooling plate 2 can be replaced at any time.

In the process of using the battery pack, in order to achieve the adjustment of the cooling plate 2 on the operating temperature of the battery, the cooling plate 2 generally has a cooling liquid circulating therein, and the cooling liquid can be heated or stopped being heated in order to adjust the temperature, or the cooling plate 2 may be provided with heating membranes for temperature adjustment.

In reference to FIGS. 1 and 2, a plurality of the seventh mounting holes 11 can be provided on the exterior of the casing 1 of the battery pack, and the bracket assembly 3 is fixedly connected to the casing 1 by the plurality of the seventh mounting holes 11 on the casing 1 through fasteners S.

Figure 3:
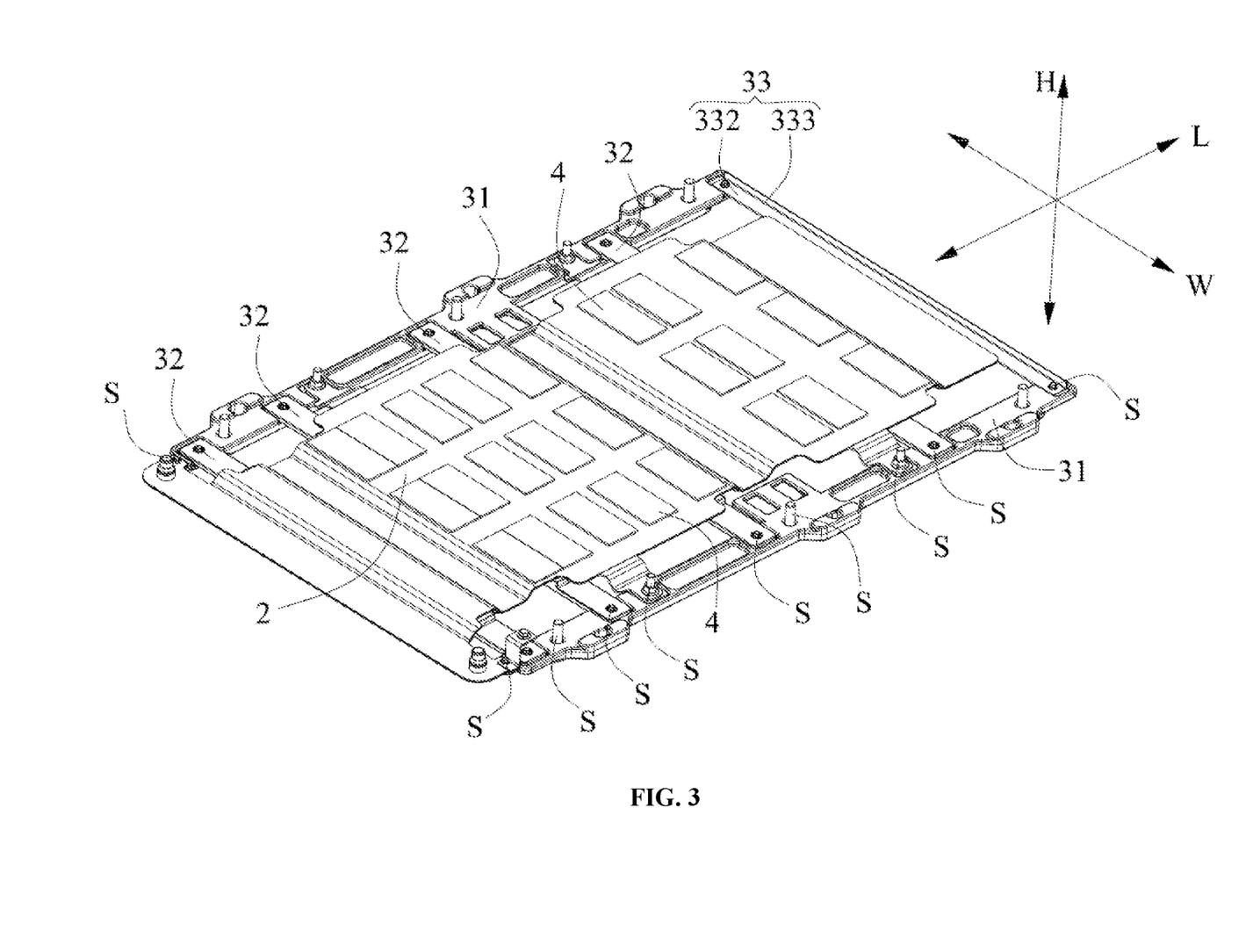
FIG. 3 is an assembled view of a cooling plate, a bracket assembly, and a thermal pad, according to some embodiments of the present disclosure.
Figure 4:
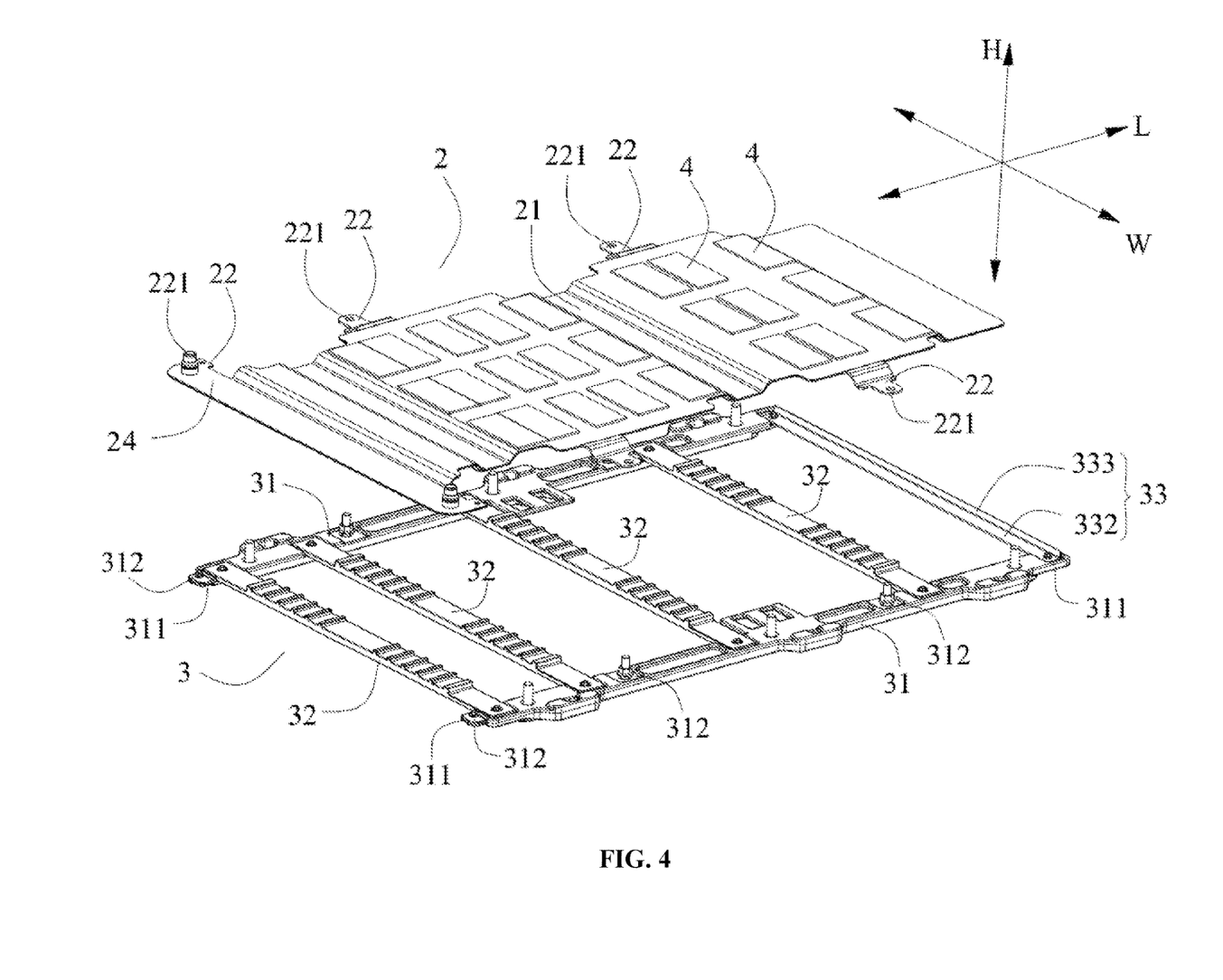
FIG. 4 is a disassembled view of FIG. 3, according to some embodiments of the present disclosure.

In reference to FIGS. 3 and 4, the bracket assembly 3 can include at least two longitudinal beams 31, which are arranged apart along a width direction W; and at least two transverse beams 32, which are arranged apart along a length direction L. The two transverse beam ends 321 in the width direction W of each transverse beams 32 can be respectively fixedly connected to a corresponding a longitudinal beam 31. Moreover, the longitudinal beams 31 and the transverse beams 32 each can be made from a metal material, such as stainless steel, aluminum or aluminum alloy, and the like.

Herein, the bracket assembly 3 can be made by interconnecting at least two longitudinal beams 31 and at least two transverse beams 32 so as to form a frame structure. The bracket assembly 3 with this frame structure can allow a space with air circulation between the cooling plate 2 and the mounting plate. Since the thermal conductivity of air is very low, this can further reduce the heat transfer efficiency between the mounting plate and the cooling plate 2, and thus reduce the impact of the temperature of the mounting plate on the temperature of the coolant within the cooling plate 2, thereby improving the cooling or heating efficiency of the cooling plate 2 on the battery. Moreover, the load-carrying capacity and impact resistance of such a frame structure are very high, and the structural strength of the entire battery pack is thus improved. During the process of installation and transportation of the battery pack, the bracket assembly 3 can directly resist the impact or collision from an external object (including from the mounting plate) on the cooling plate 2, thereby avoiding a damage on the cooling plate 2 caused by an external force. In this way, the frame assembly 3 can provide a good protection for the cooling plate 2. In addition, this frame structure may also help to save materials and thus greatly reduces the costs.

In reference to FIGS. 2 through 4, the number of the longitudinal beam 31 can be two. However, it is not limited thereto, and in order to further enhance the strength of the entire bracket assembly 3, the number of the longitudinal beam 31 can be increased accordingly.

The bracket assembly 3 can be arranged below the cooling plate 2 for supporting and fixedly mounting the cooling plate 2. In reference to FIGS. 4 and 5, the cooling plate 2 can have a main body portion 21 and a plurality of first mounting portions 22, each of the first mounting portions 22 can be protrudingly formed from the main body portion 21. In addition, in reference to FIGS. 3, 4 and 6, each of the longitudinal beams 31 can include a plurality of second mounting portions 312 formed on a side of the longitudinal beam 31 facing the cooling plate 2, each of the second mounting portions 312 can engage a corresponding first mounting portion 22 of the cooling plate 2 and can be fixedly connected to the corresponding first mounting portion 22. During the process when the cooling plate 2 and the bracket assembly 3 are assembled, the cooling plate 2 can be quickly positioned due to the cooperation relationship between the second mounting portions 312 and the corresponding first mounting portion 22. In this way, the cooling plate 2 and the bracket assembly 3 can be quickly assembled together.

In order to control the overall size of the cooling plate 2 and the bracket assembly 3 as a whole in the height direction H, the second mounting portions 312 of the longitudinal beams 31 can have protrusion recess engagement therebetween. Specifically, each of the second mounting portions 312 can be a protruding portion, and accordingly, the corresponding first mounting portion 22 can be a groove. Alternatively, each of the second mounting portions 312 can be a groove (as shown in FIGS. 4 and 6), and accordingly, the corresponding first mounting portion 22 can be a protruding portion (as shown in FIGS. 4 and 5).

Figure 5:
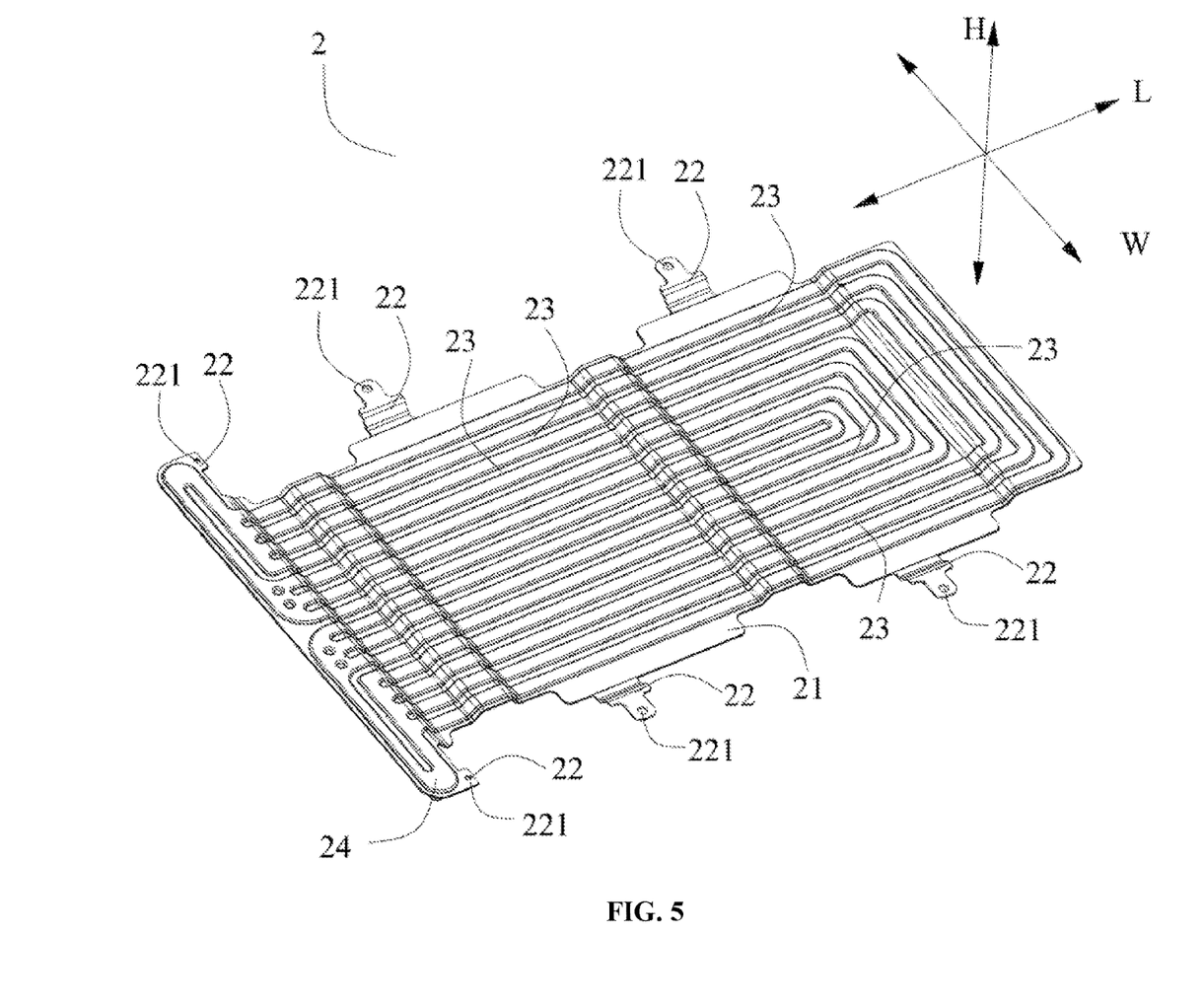
FIG. 5 is a back view of the cooling plate, according to some embodiments of the present disclosure.
Figure 6:
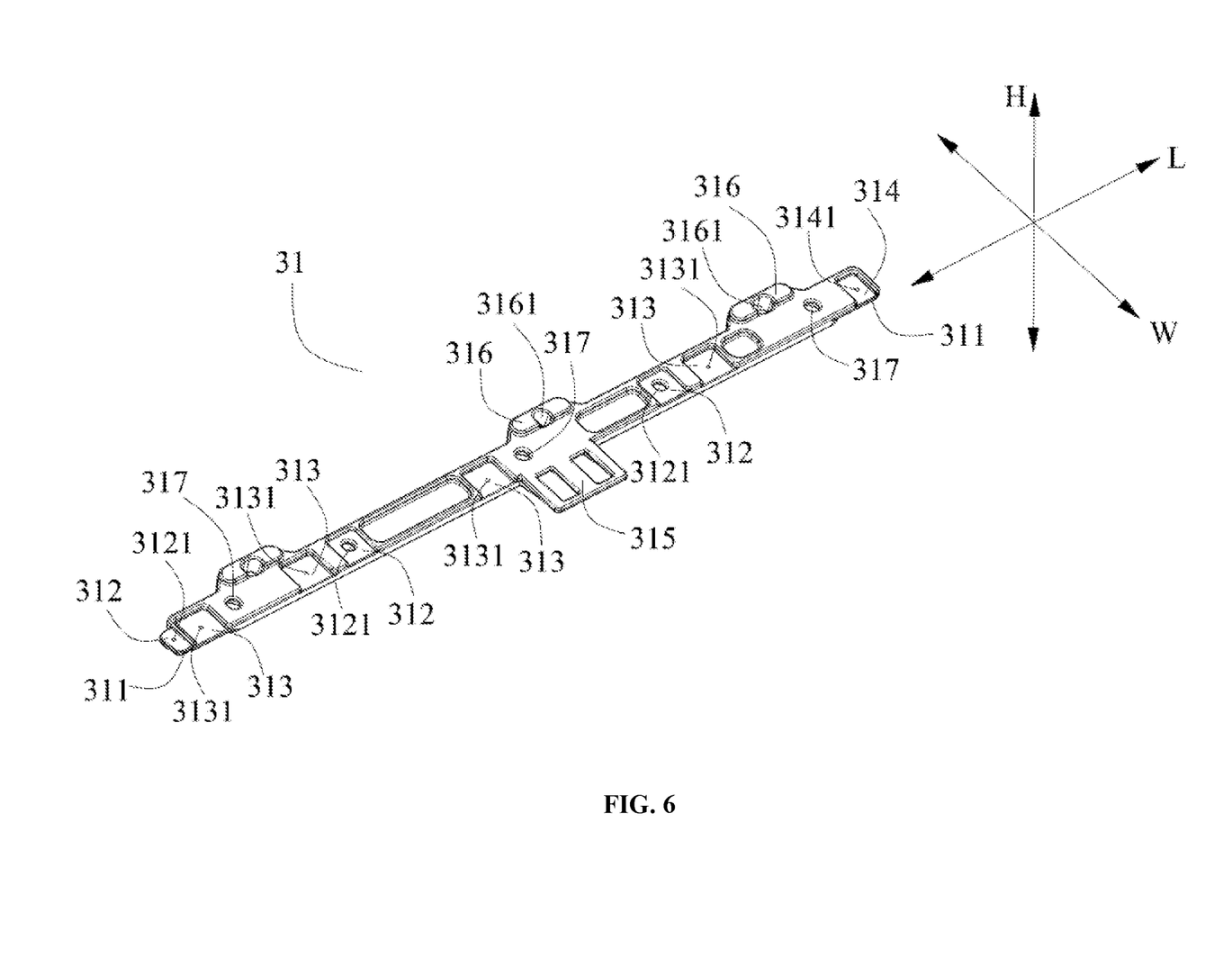
FIG. 6 is a top view of the longitudinal beams of the bracket assembly, according to some embodiments of the present disclosure.

In reference to FIGS. 4 and 5, the first mounting portions 22 can be formed to protrude in the width direction W on both sides in the width direction W of the main body portion 21, and the first mounting portions 22 on the same side in the width direction W of the main body portion 21 can be spaced apart.

In reference to FIGS. 4 and 5, the cooling plate 2 can further include an extending portion 24 formed on one side of the longitudinal direction L of the main body portion 21 and protruding in the width direction W from the main body portion 21. The first mounting portion 22 can be formed at both ends of the width direction W of the extending portion 24 and protrude in the length direction L, and the second mounting portions 312 that is engaged with the first mounting portions 22 on the extending portion 24 can be formed on the longitudinal beam end 311 of each of the longitudinal beams 31.

In reference to FIG. 3, the plurality of first mounting portions 22 of the cooling plate 2 can be fixedly connected to the second mounting portions 312 of each of the longitudinal beams 31 of the bracket assembly 3 through the fasteners S. More specifically, in reference to FIGS. 4 and 5, each of the first mounting portions 22 of the cooling plate 2 can be provided with a first mounting hole 221. In reference to FIGS. 6 and 7, each of the second mounting portions 312 on one of the longitudinal beams 31 can be provided with a second mounting hole 3121. When assembling the cooling plate 2 and the longitudinal beams 31, each of the first mounting holes 221 of the cooling plate 2 and a corresponding second mounting hole 3112 on a longitudinal beam 31 can be vertically aligned in the height direction H and are provided for a corresponding fastener S to pass through such that the cooling plate 2 and the longitudinal beams 31 can be fixedly connected with each other.

In order to ensure the reliability of the connection between the cooling plate 2 and the casing 1, the second mounting holes 3121 on the bracket assembly 3, the first mounting holes 221 on the cooling plate 2, and the corresponding seventh mounting holes 11 on the casing 1 can be fixedly connected together via the fasteners S.

In reference to FIGS. 3 through 5, due to the easy and simple operation of a protrusion recess engagement, the cooling plate 2 can be fixedly connected to the respective transverse beams 32 of the bracket assembly 3 through the protrusion recess engagement, so as to facilitate quick assembling of the cooling plate 2 and the bracket assembly 3. Specifically, in reference to FIG. 5, the cooling plate 2 can further include a plurality of first engaging portions 23 formed on the side of the cooling plate 2 facing the bracket assembly 3 and arranged apart along the width direction W. In reference to FIGS. 4, 8 and 9, each of the transverse beams 32 can further include a plurality of second engaging portions 322 formed on the side of the transverse beams 32 facing the cooling plate 2 and arranged apart in the width direction W, and each of the second engaging portions 322 has a protrusion recess engagement with a corresponding one of the first engaging portions 24. Herein, based on the protrusion recess engagement between each of the second engaging portions 322 on the transverse beams 32 and the corresponding one of the first engaging portions 23 on the cooling plate 2, the relative movement of the cooling plate 2 and the transverse beams 32 in the width direction W is limited, such that the cooling plate 2 is firmly fixed to the bracket assembly 3, and the bracket assembly 3 is fixedly connected to the casing 1, thereby ensuring the reliable connection between the cooling plate 2 and the casing 1.

Each of the first engaging portions 23 of the cooling plate 2 may be a protruding portion, accordingly, each of the second engaging portions 322 on one of the transverse beams 32 can be a recess or groove. Alternatively, each of the first engaging portions 23 of the cooling plate 2 may be a recess (as shown in FIG. 5), accordingly, each of the second engaging portions 322 on one of the transverse beams 32 is a protruding portion (as shown in FIG. 8).

In reference to FIG. 5, each of the first engaging portions 23 of the cooling plate 2 can be a U-shaped structure, and the plurality of first engaging portions 23 are gradually distributed from the inside towards the outside (that is, formed into a radiation-like structure).

Figure 8:
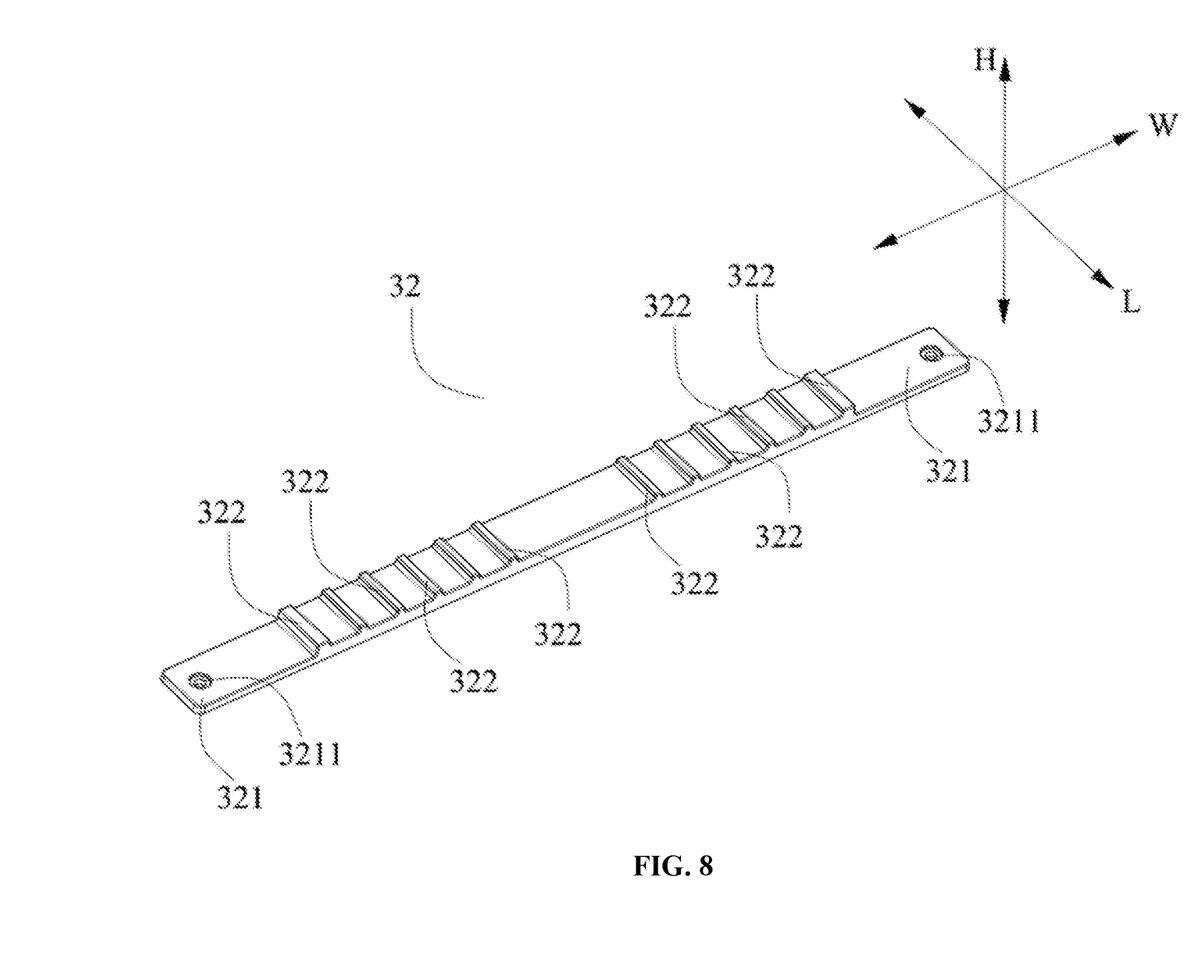
FIG. 8 is a top view of the transverse beams of the bracket assembly, according to some embodiments of the present disclosure.
Figure 9:
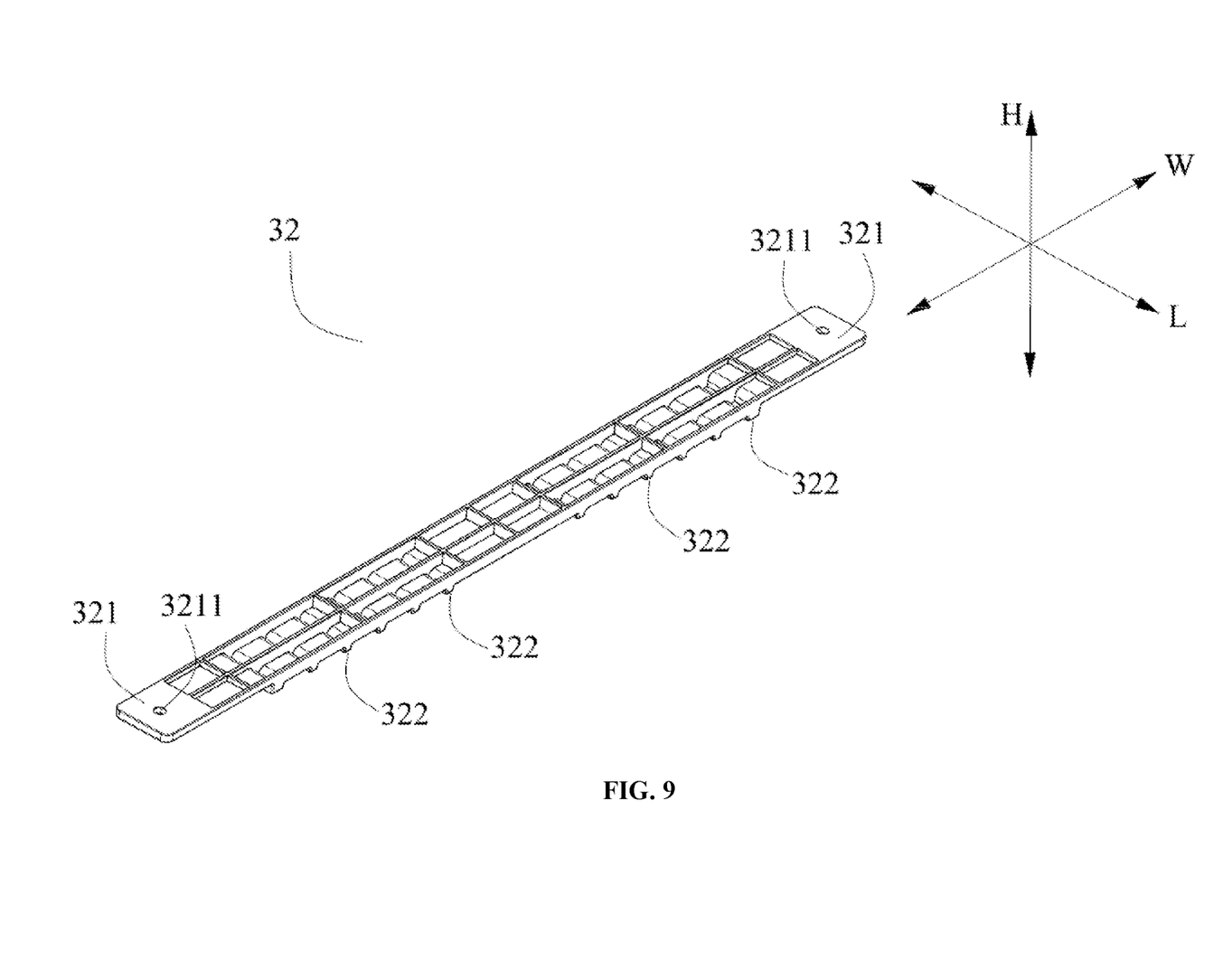
FIG. 9 is a back view of the transverse beams of the bracket assembly, according to some embodiments of the present disclosure.

In reference to FIGS. 8 and 9, the plurality of second engaging portions 322 of each of the transverse beams 32 can form a serrated structure, and symmetrically distributed.

In reference to FIGS. 3, 4 and 6, each of the longitudinal beams 31 can further include a plurality of third mounting portions 313 formed on the side of the longitudinal beam 31 facing the cooling plate 2 and arranged apart in the length direction L, and each of the third mounting portions 313 can be fixedly connected to a transverse beam end 321 of a corresponding transverse beam 32. When assembling the at least two longitudinal beams 31 and the at least two transverse beams 32 of the bracket assembly 3, the third mounting portions 313 of the longitudinal beams 31 can be used for quickly positioning the transverse beams 32, so as to facilitate quickly assembling the longitudinal beams 31 and the plurality of transverse beams 32 into one unit. Specifically, each of the third mounting portions 313 of the longitudinal beams 31 may be a groove, and each of the third mounting portions 313 can receive and fixedly connect one transverse beam end 321 of a corresponding transverse beam 32. In this way, the overall size of the cooling plate 2 and the bracket assembly 3 along the height direction H is reduced.

In reference to FIG. 3, each of the transverse beams 32 can be fixedly connected to the longitudinal beams 31 through the fasteners S. Specifically, in reference to FIGS. 6 and 7, each of the third mounting portions 313 of the longitudinal beams 31 can be provided with a third mounting hole 3131. In reference to FIGS. 8 and 9, each of the transverse beam ends 321 of the transverse beams 32 can be provided with a fifth mounting hole 3211. When the at least two longitudinal beams 31 and the at least two transverse beams 32 are assembled together, the fifth mounting holes 3211 of the respective transverse beams 32 can be vertically aligned with the third mounting holes 3131 of the corresponding longitudinal beams 31 in the height direction H, such that a fastener S can pass through these holes to fixedly connect the transverse beams 32 and the longitudinal beams 31.

In reference to FIGS. 3 and 4, the bracket assembly 3 can further include a protective beam 33 fixedly connected to the longitudinal beam ends 311 of each longitudinal beam 31 in the length direction L for protecting the cooling plate 2 in the length direction L. The protective beam 33 can be made of a metal material such as stainless steel, aluminum or aluminum alloy.

The number of protective beam 33 can be one. When the battery pack is mounted on the mounting plate, one end of the battery pack provided with the protective beam 33 in the length direction L can be first placed on the mounting plate, and then the entire battery pack can be pushed into the mounting plate along the length direction L. In this way, based on the setting of the protective beam 33, the present disclosure can prevent the cooling plate 2 from being damaged during the installation of the battery pack.

Figure 7:
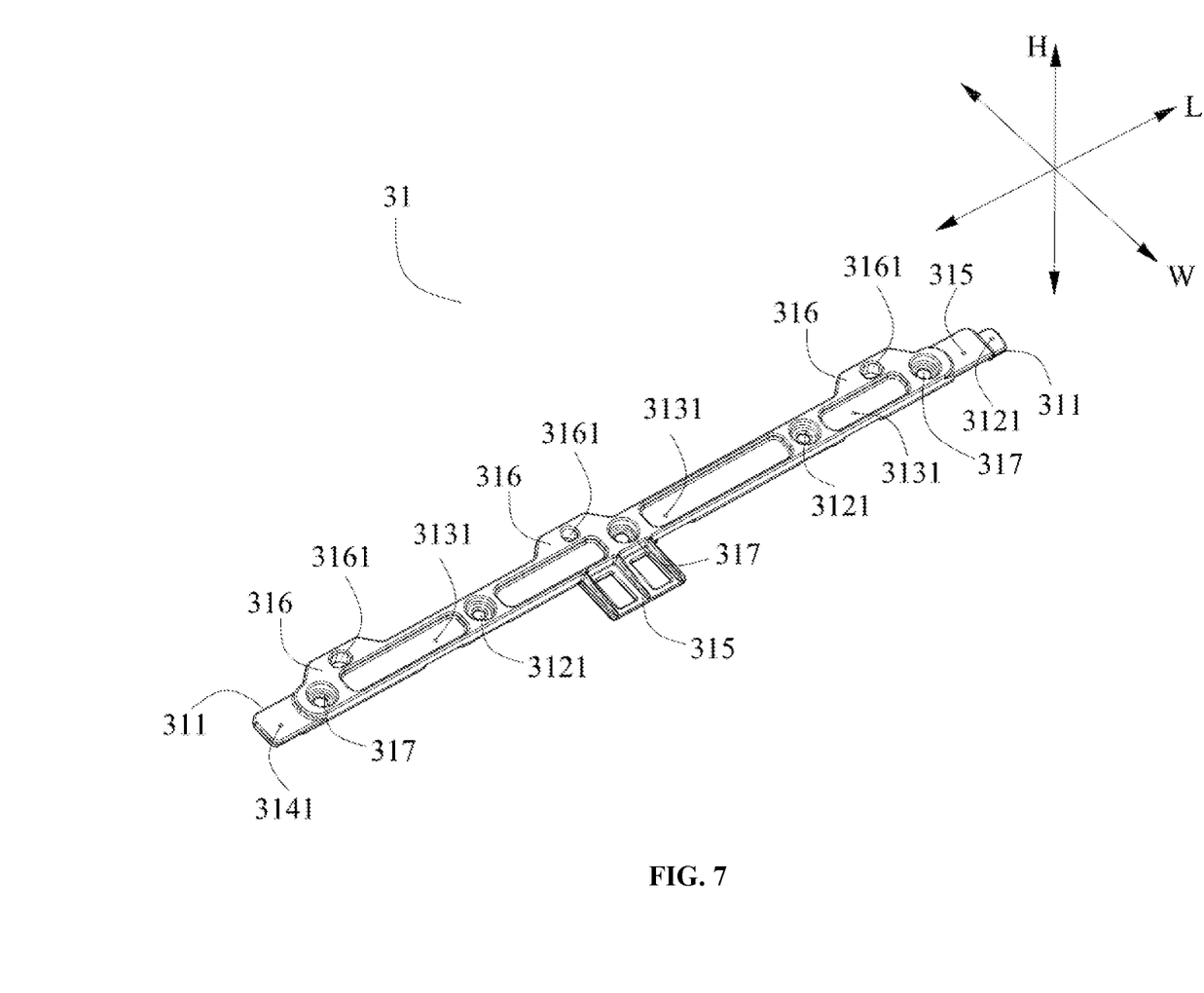
FIG. 7 is a back view of the longitudinal beams of the bracket assembly, according to some embodiments of the present disclosure.

In order to quickly position the protective beam 33 so as to quickly mount the protective beam 33 on the longitudinal beam ends 311 of the longitudinal beams, in reference to FIGS. 6 and 7, each of the longitudinal beams 31 can further include a fourth mounting portion 314 formed on the side of the longitudinal beam end 311 facing the cooling plate 2 and fixedly connected to the protective beam 33. Specifically, the fourth mounting portion 314 of each of the longitudinal beams 31 can be a recess or groove, and the fourth mounting portion 314 receives and fixedly connects with the protective beam 33, thereby reducing the overall size of the cooling element 2 and the bracket assembly 3 in the height direction H.

It is further noted that the fourth mounting portions 314 on the same longitudinal beam 31 and the second mounting portions 312 that cooperate with the first mounting portions 22 on the extending portion 24 can be respectively disposed at the two longitudinal beam ends 311 in the length direction L of the longitudinal beams 31.

The protective beam 33 can be fixedly connected to the longitudinal beam ends 311 of each longitudinal beam 31 through a fastener S. Specifically, in reference to FIGS. 6 and 7, the fourth mounting portions 314 of each of the longitudinal beams 31 can be provided with a fourth mounting hole 3141. In reference to FIG. 10, the protective beam 33 can be provided with a sixth mounting hole 331. When the protective beam 33 and the longitudinal beams 31 are assembled together, the sixth mounting holes 331 on the protective beam 33 and the fourth mounting hole 3141 on the corresponding longitudinal beam 31 can be vertically aligned in the height direction H, through which a fastener S passes through so as to fixedly connect the protective beam 33 and the longitudinal beams 31.

Figure 10:
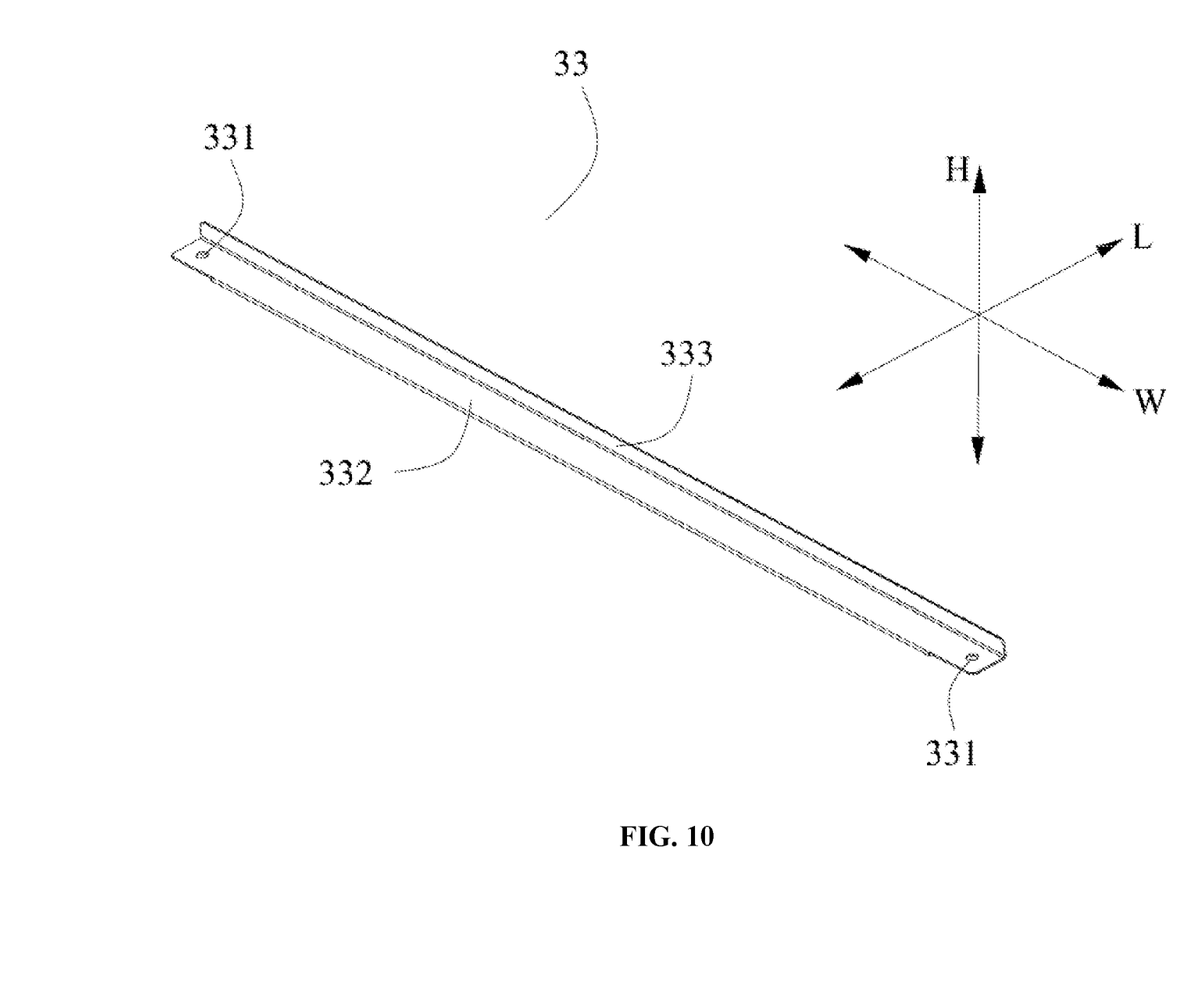
FIG. 10 is a perspective view of the protective beam of the bracket assembly, according to some embodiments of the present disclosure.

In reference to FIG. 10, the protective beam 33 can include a flat plate portion 332, which is arranged side by side with the at least two transverse beams 32; and a side plate portion 333, which protrudes from the flat plate portion 333 in the height direction H and is located on one side of the longitudinal direction L of the cooling plate 2, and protects the cooling plate 2 in the longitudinal direction L. After the assembly of the cooling plate 2 and the bracket assembly 3 is finished, in reference to FIGS. 3 and 4, the flat plate portion 332 of the protective beam 33 and the transverse beams 32 together can support the cooling plate 2 on the bottom, so as to enhance the overall structural strength of the bracket assembly 3 as a whole. The side plate portion 333 of the protective beam 33 is located on the side in length direction L of the cooling plate 2, so that the side plate portion 333 can protect the cooling plate 2 in the length direction L.

In reference to FIGS. 6 and 7, each of the longitudinal beams 31 can further include a supporting member 315, which is formed on a side of the width direction W of the longitudinal beam 31 and extends in the width direction W. The supporting member 315 of the longitudinal beams 31 can be bonded to the casing 1 through a structural adhesive, thereby improving the reliability of the connection between the cooling plate 2 and the casing 1, and contributing to the improvement of the structural strength of the entire battery pack.

In reference to FIGS. 6 and 7, each of the longitudinal beams 31 can further include a mounting member 316, which can be formed on the other side in the width direction W of a longitudinal beam 31 and extends in the width direction W. The mounting member 316 of each of the longitudinal beams 31 can be used in the connection and fixation between the battery pack and the electric vehicle.

Further in reference to FIGS. 6 and 7, the mounting member 316 of each of the side members 31 can be provided with a connecting hole 3161. The connecting hole 3161 can be used for the fastener S to pass through so as to tightly lock the battery pack and the electric vehicle together.

In reference to FIGS. 6 and 7, each of the longitudinal beams 31 can be provided with a plurality of fixing holes 317 which are spaced apart in the length direction L, and each of the fixing holes 317 penetrates through the longitudinal beam 31 in the height direction H. The fixing holes 317 of the longitudinal beams 31 can be used to achieve the connection and fixation between the bracket assembly 3 and the casing 1 of the battery pack through the fastener S.

In order to quickly transfer the heat from the casing 1 of the battery pack to the cooling plate 2, in reference to FIGS. 2 to 4, the battery pack may further include a thermal pad 4 disposed between the casing 1 and the cooling plate 2. In addition, the number of the thermal pad 4 can be reasonably adjusted according to the needs of the battery pack.

In order to ensure the flatness of the bottom of the bracket assembly 3 so as to facilitate reliable installation of the battery pack on the electric vehicle, the distal end of each of the second mounting holes 3121 away from the cooling plate 2 may form a countersunk slot structure for receiving a corresponding fastener S, and the distal end of each fixing hole 317 away from the cooling plate 2 may also form a countersunk slot structure for receiving the corresponding fastener S, as shown in FIG. 7.

Finally, it is noted that the fixing holes 317 of the longitudinal beams 31 of the bracket assembly 3 and the corresponding seventh mounting holes 11 of the casing 1 can be fixedly connected together by the fasteners S, so as to achieve a first reliable connection between the bracket assembly 3 and the casing 1. The first mounting holes 221 of the cooling plate 2, the corresponding second mounting holes 3121 on the longitudinal beams 31 of the bracket assembly 3, and the corresponding seventh mounting holes 11 of the casing 1 can be fixedly connected together by the fasteners S, so as to achieve a second reliable connection between the bracket assembly 3 and the casing 1. The supporting members 315 of the longitudinal beams 31 of the bracket assembly 3 can be bonded to the casing 1 through the structural adhesive, so as to achieve a third reliable connection between the bracket assembly 3 and the casing 1. In this way, it is ensured that there is a reliable connection between the bracket assembly 3 and the casing 1. In addition, since the bracket assembly 3 can support and fix the cooling plate 2, the reliability of the connection between the cooling plate 2 and the casing 1 can also be ensured.

The fastener S described above can include, but is not limited to a bolt, latch, nail, clip, pin, buckle, screw, washer, and staple. In some embodiments, the fastener is a bolt.

While the disclosure has been described in connection with certain embodiments, it is to be understood that the disclosure is not to be limited to the disclosed embodiments but, on the contrary, is intended to cover various modifications and equivalent arrangements included within the spirit and scope of the disclosure, which scope is to be accorded the broadest interpretation so as to encompass all such modifications and equivalent structures as is permitted under the law.

What is claimed is:

1. A battery pack for an electric vehicle, the battery pack comprising:
    a casing wherein a battery is placed;
    a cooling plate located below the casing in a height direction; and
    a bracket assembly located below the cooling plate in the height direction and fixedly connected to the casing, wherein the bracket assembly is used for a direct contact with a mounting plate of the electric vehicle,
    wherein the bracket assembly comprises:
        at least two longitudinal beams arranged apart along a width direction;
        at least two transverse beams arranged apart along a length direction with transverse beam ends in the width direction of each of the transverse beams respectively fixedly connected to the corresponding longitudinal beam; and
        a protective beam fixedly connected to longitudinal beam ends of each of the longitudinal beams in the length direction for protecting the cooling plate in the length direction.

2. The battery pack according to claim 1, wherein:
    the cooling plate comprises a main body portion and a plurality of first mounting portions, provided that each of the first mounting portions is protrudingly formed from the main body portion; and
    each of the longitudinal beams comprises a plurality of second mounting portions formed on a side of each of the longitudinal beams facing the cooling plate, provided that each of the second mounting portions engages a corresponding first mounting portion of the cooling plate and is fixedly connected to the corresponding first mounting portion.

3. The battery pack according to claim 1, wherein:
    the cooling plate comprises a plurality of first engaging portions formed on a side of the cooling plate facing the bracket assembly and arranged apart along the width direction; and
    each of the transverse beams comprises a plurality of second engaging portions formed on a side of the transverse beams facing the cooling plate and arranged apart in the width direction, and each of the second engaging portions has a protrusion recess engagement with a corresponding one of the first engaging portions.

4. The battery pack according to claim 3, wherein:
    each of the first engaging portions of the cooling plate forms a U-shaped structure; and
    the plurality of the second engaging portions of the transverse beams form a serrated structure.

5. The battery pack according to claim 2, wherein each of the longitudinal beams comprises a plurality of third mounting portions formed on a side of each of the longitudinal beams facing the cooling plate and arranged apart in the length direction, wherein each of the third mounting portions is fixedly connected to a transverse beam end of the corresponding transverse beam.

6. The battery pack according to claim 5, wherein each of the longitudinal beams comprises a fourth mounting portion formed on a side of each of the longitudinal beams end facing the cooling plate and fixedly connected to the protective beam.

7. The battery pack according to claim 1, wherein the protective beam comprises:
   a flat plate portion arranged side by side with the at least two transverse beams; and
   a side plate portion protruding from the flat plate portion in the height direction and located on a side of the longitudinal direction of the cooling plate, wherein the side plate portion protects the cooling plate in the longitudinal direction.

8. The battery pack according to claim 1, wherein each of the longitudinal beams comprises:
   a supporting member formed on a side of the width direction of each of the longitudinal beams and extending in the width direction; and
   a mounting member formed on the other side of the width direction of each of the longitudinal beams and extending in the width direction.

9. The battery pack according to claim 1, wherein the battery comprises a lithium ion battery.

10. The battery pack according to claim 1, wherein each of the longitudinal beams comprises a plurality of fixing holes fixedly connected to a plurality of mounting holes in the casing.

11. The battery pack according to claim 2, wherein the plurality of the first mounting portions on the cooling plate and the plurality of the second mounting portions on the longitudinal beams are further fixedly connected to a plurality of mounting holes in the casing.

12. The battery pack according to claim 8, wherein the supporting member on the longitudinal beams is bonded to the casing.

13. The battery pack according to claim 1, wherein the bracket assembly is connected to the casing by a fastener.

14. The battery pack according to claim 13, wherein the fastener comprises a bolt.

15. An electric vehicle comprising a battery pack, the battery pack comprising:
   a casing wherein a battery is placed;
   a cooling plate located below the casing in a height direction; and
   a bracket assembly located below the cooling plate in the height direction and fixedly connected to the casing, wherein the bracket assembly is used for a direct contact with a mounting plate of the electric vehicle, wherein the bracket assembly comprises:
      at least two longitudinal beams arranged apart along a width direction;
      at least two transverse beams arranged apart along a length direction with two transverse beam ends in the width direction of each of the transverse beams respectively fixedly connected to the corresponding longitudinal beam; and
      a protective beam fixedly connected to longitudinal beam ends of each of the longitudinal beams in the length direction.

* * * * *